M. T. TAYLOR & J. F. GARDINER.
ROCK DRILL CHUCK.
APPLICATION FILED MAY 16, 1913.

1,132,636.

Patented Mar. 23, 1915.

WITNESSES
Charles B Crompton
John A. Percival

M. T. TAYLOR.
J. F. GARDINER.
INVENTORS

BY Croydon Marks
ATTORNEY

UNITED STATES PATENT OFFICE.

MARTIN THOMAS TAYLOR, OF PHOENIX MINES, NEAR LISKEARD, CORNWALL, ENGLAND, AND JOHN FRANCIS GARDINER, OF MOUNT CHALMERS, QUEENSLAND, AUSTRALIA.

ROCK-DRILL CHUCK.

1,132,636.

Specification of Letters Patent.

Patented Mar. 23, 1915.

Application filed May 16, 1913. Serial No. 768,067.

*To all whom it may concern:*

Be it known that we, MARTIN THOMAS TAYLOR and JOHN FRANCIS GARDINER, subjects of the King of Great Britain and Ireland, and residing at the Phoenix Mines, near Liskeard, Cornwall, England, and at Mount Chalmers, in the State of Queensland, Commonwealth of Australia, respectively, have invented certain new and useful Improvements in Rock-Drill Chucks, of which the following is a specification.

This invention relates to an improved rock drill chuck and refers more especially to a chuck for the connection of drill bits to the piston rods of rock drills of the reciprocating percussion type driven by compressed air or any other motive power.

The object of this invention is to provide an improved chuck affording means of connection of drill bits to the piston rods of rock drills in such manner that the operation of attaching and detaching may be greatly facilitated and by which drill bits may be used sharpened at both ends (or if desired, of different types) thereby effecting a great saving in the amount of material used. We accomplish this object by providing a chuck which consists of a chuck casing having a longitudinal slot formed therein for the reception of the drill bit and a diagonal keyway cut transversely thereto with a tapered key in the said keyway adapted to bear upon the shank of the bit and hold the same in place.

The invention will now be more fully described aided by a reference to the accompanying sheet of drawings in which—

Figure 1:
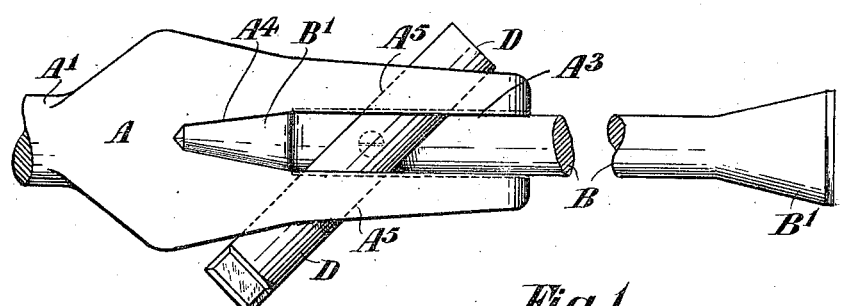
Figures 2, 3:
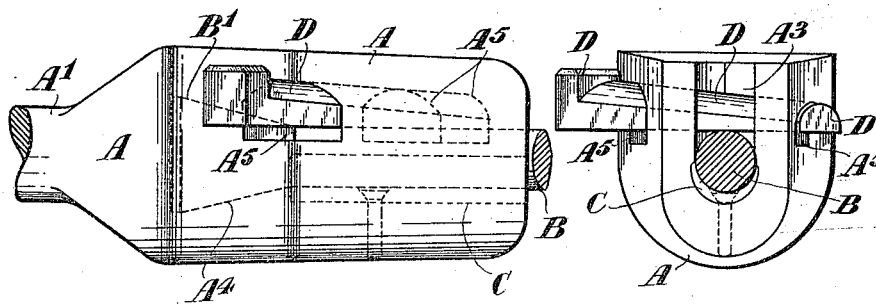
Figure 4:
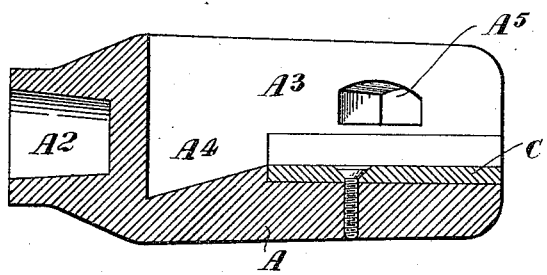

Figure 1 is a plan of a drill chuck constructed according to this invention in which the chuck is integral with the piston rod showing the drill bit secured in position. Fig. 2 is a side view, and Fig. 3 an end view of the same. Fig. 4 is a central longitudinal section of a chuck with the bit removed, adapted to be connected to the end of the piston rod.

In constructing a rock drill chuck according to our invention we form the chuck A either integral with the piston rod A' of the drill as shown in Figs. 1 and 2, by being forged thereon, or the same may be detachable and affixed thereto by the tapered end of the piston rod A' engaging a tapered hole $A^2$ in the said chuck casing (Fig. 4). As shown in the drawings, the chuck A is formed with a longitudinal slot or opening $A^3$ extending into the center of the same where it may be enlarged or splayed as at $A^4$ (Fig. 4) for the reception of the splayed end B' of the drill B when the same is sharpened at both ends. A liner or bush C is fitted in the said slot $A^3$ and on which the shank of the drill B bears. The chuck A is formed with a diagonal keyway $A^5$ cut transversely to the said slot $A^3$ for the reception of a tapered key D, which is adapted to bear on the shank of the drill bit B. The said key D being tapered and arranged diagonally in the chuck holds the drill B firmly in position and maintains the same so in operation.

The tapered key C is constructed preferably as shown having a flat bottom surface engaging the shank of the drill B while its top surface is curved and adapted to engage the similar shaped keyway $A^5$ in order to provide a greater bearing surface for the key.

The drill bit B is easily removable or reversible by simply knocking out the key C and the said bit readily changed or reversed as desired.

We claim:—

A rock drill chuck having a longitudinal slot opening formed in the side thereof adapted to receive the end of a drill bit, and provided with a tapered keyway formed in the walls of the chuck, in combination with a tapered key, a flat surface of which engages the drill bit and a curved or rounded surface which is adapted to engage a similar shaped surface in the keyway.

In testimony, that we claim the foregoing as our invention, and have signed our names in presence of two subscribing witnesses.

MARTIN THOMAS TAYLOR.

Witnesses:
W. K. TRIPE,
A. W. GLANDFIELD.

JOHN FRANCIS GARDINER.

Witnesses:
JOHN ADAM,
JOHN W. BROWN.

Copies of this patent may be obtained for five cents each, by addressing the "Commissioner of Patents, Washington, D. C."